3,407,160
RHEOLOGICAL AGENTS
Fred M. Frank, Rego Park, N.Y., assignor to The Baker Castor Oil Company, Bayonne, N.J., a corporation of New Jersey
No Drawing. Filed Oct. 19, 1965, Ser. No. 498,101
11 Claims. (Cl. 260—28.5)

ABSTRACT OF THE DISCLOSURE

Thixotropic and rheological-property-modifying compositions for use in nonaqueous paint products are described which comprise a modified oxidized hydrocarbon wax selected from the class consisting of modified oxidized microcrystalline waxes and modified oxidized Fischer-Tropsch waxes. These waxes impart desirable properties to a paint product such as effective pigment suspension, good anti-sag properties, increased thixotropic body and increased viscosity.

---

The present invention relates to thixotropic and rheological-property-modifying agents for nonaqueous fluid systems. More particularly, the invention is concerned with the method or process of improving the rheological properties of paint compositions by incorporating thereing oxidized hydrocarbon waxes and/or modified oxidized hydrocarbon waxes.

The rheological-property-modifying agents of this invention are characterized by having many advantageous properties, but especially that of stability at elevated processing temperatures.

Previously available rheological-property-modifying and suspending agents have possessed various defects which are overcome by the agents of this invention. Thus, aluminum stearate is notably deficient in its ability to maintain pigments in suspension in most organic vehicles and in the case with which pigments can be redispersed after setting from such suspensions during long periods of aging. The gel produced by the incorporation of aluminum stearate in organic vehicles is of a rubbery type, rather than the desirable thixotropic type of gel which is effective in maintaining stable suspensions. The presence of aluminum stearate in pigment suspensions, such as paints, has no beneficial effect on the brushability properties of such suspensions. Organic derivatives of montmorillonite have also been used as suspending agents. However, certain of such derivatives are effective only in the presence of aromatic and polar solvents and, consequently, are inefficient when incorporated in the presently favored odorless, aliphatic hydrocarbon vehicles. Polyethylene has also been tried as a suspending agent, but it, too, has its drawbacks in this regard. For example, paints containing polyethylene as a suspending agent are characterized by settling of the pigment contained therein within a few days, have poor anti-sag properties, and display little or no puff during the initial milling of the paint constituents or thereafter; "puff" refers to the desirable blown-up appearance of paint indicative of a good dispersion, and resembling whipped cream in appearance.

Hydrogenated castor oil in a powdered form has also previously been used as a thixotropic rheological agent for oil-base and solvent base systems such as paints, varnishes, enamels, etc. However, while the hydrogenated castor oil is an efficient thixotropic agent, it has the disadvantage of being unstable at the elevated temperatures developed during grinding or dispersion in the paint mills, with the result that there is seeding or the formation of small grains in the paint; this lack of smoothness is highly undesirable in most suspensions, including those used in the protective coating field. Thus, hydrogenated castor oil has not been fully satisfactory for utilization in paint systems because of its tendency to seed when processed at temperatures above 130° F. Even if a satisfactory paint is produced below that temperature, when it is stored for some time at temperatures higher than 130° F., seeds slowly develop. The word "seed" as used herein means the formation of finely divided solid particles which give the paint a poor appearance in the can and reduce the fineness of the grind of the paint when brushed on a substrate or checked on a fineness of grind gage.

It has now been discovered that the incorporation of oxidized hydrocarbon waxes and/or modified oxidized hydrocarbon waxes into paint compositions permit the use of high processing temperatures during the grinding or other dispersing step. For greatest efficiency, a high processing temperature is desirable. At the same time these waxes impart desirable properties to the paint formulation, such as effective pigment suspension, good anti-sag properties, increased thixotropic body, good bushability, increased viscosity, controlled penetration of the finished composition and color uniformity.

The waxes which are suitable for incorporation into non-aqueous fluid systems of the present invention, such as a paint product are so-called oxidized microcrystalline waxes, modified oxidized microchystalline waxes, oxidized Fischer-Tropsch waxes and modified oxidized Fischer-Tropsch waxes. The preferred class of waxes are the modified oxidized microcrystalline and Fischer-Tropsch waxes. The aforementioned waxes and the processes for their preparation are well known in the art. For example, the production of microcrystalline waxes and their properties and characteristics have been described in the literature (see for example U.S. Patent 2,443,840). The Fischer-Tropsch waxes have also been described in the literature (see Chapter 14 in "Fischer-Tropsch Processes," Weil & Lane, Constable & Co., Ltd., London, 1949).

The methods of oxidizing microcrystalline and Fischer-Tropsch waxes are known in the art. These waxes have been subjected to oxidation in various manners and in particular by the use of air, or oxidation in the presence of an oxidation catalyst, such as a wax soluble organic salt. Examples of suitable soluble organic salts would include manganese or cobalt naphthenate. The oxidation procedures can be carried out in the manner described in the literature, such as in U.S. Patents Nos. 2,249,708, 2,674,613 and 2,890,125. The modified oxidized microcrystalline and modified oxidized Fischer-Tropsch waxes of the present invention are those which have been modified with a polyethylene, an emulsifiable polyethylene or any combination or blend of these materials. Preferably, the modified oxidized microcrystalline and Fischer-Tropsch waxes are prepared by combining the corresponding unoxidized wax with a polyethylene and/or an emulsifiable polyethylene and subjecting the resulting mixture to conventional oxidation conditions for non-benzenoid hydrocarbon waxes in the presence of a catalyst such as cobalt napthenate. However, modified oxidized hydrocarbon waxes can also be prepared by first oxidizing the desired wax under conventional oxidation conditions for non-benzenoid hydrocarbon waxes and subsequently reacting the oxidized product with a polyethylene and/or an emulsifiable polyethylene. The polyethylenes and emulsifiable polyethylenes useful to modify the waxes may be of either high or low molecular weight. The properties and characteristics of suitable polyethylenes and emulsifiable polyethylenes are disclosed, for example, in U.S. Patents Nos. 2,504,400, 2,890,125 and 3,123,488.

The above described waxes may be further modified. For example, the modified oxidized microcrystalline and Fischer-Tropsch waxes described above may be blended with each other or with unmodified oxidized microcrystalline or Fischer-Tropsch waxes. It has also been found that useful waxes for incorporation in paint products result when unmodified oxidized microcrystalline waxes, unmodified oxidized Fischer-Tropsch waxes or polyethylene and/or emulsifiable polyethylene modified oxidized microcrystalline or Fischer-Tropsch waxes are further reacted with a polyisocyanate. Among the isocyanates which are particularly suitable for reaction with these waxes are arylene diisocyanates such as, toluene-2-4-diisocyanate, a mixture of toluene-2,4-diisocyanate and toluene-2,6-diisocyanate, diphenylmethane - 4,4'-diisocyanate, naphthylene-1,4-diisocyanate, 1-chlorophenylene-2,4-diisocyanate, diphenylether-4,4'-diisocyanate, etc. Other polyisocyanates can be employed including alkylene, polyalkylene, cycloalkylene, and alkylidine diisocyanates. Furthermore, the diisocyanates may include substituents such as halogen(s), nitro, or alkoxy substituents.

The reaction of the unmodified oxidized or modified oxidized microcrystalline and Fischer-Tropsch waxes with about 1 to about 6% by weight of a polyisocyanate, preferably tolylene diisocyanate, based on the total weight of the composition, gives best results. The reaction of the desired diisocyanate with the aforementioned waxes may be carried out in accordance with the procedure described in U.S. Patent 2,890,125.

The preferred modified oxidized waxes useful in the present invention are those having the following properties: melting point of about 180° F. to about 230° F., penetration of about 0 to about 7, saponification number of about 15 to about 65 and an acid number of about 5 to about 35. However, other modified oxidized waxes may also be employed. Preferably, the modified oxidized waxes are the Fischer-Tropsch waxes. Among the modified oxidized Fischer-Tropsch waxes which have been found particularly suitable as thixotropic and rheological-property-modifying agents are Petrolite C–7500, Petrolite C–8500 and Petrolite C–9500, all commercially available from Bareco Division, Petrolite Corporation. Satisfactory results have also been obtained with Cerathane 63–L (available commercially from Bareco Division, Petrolite Corporation). This product is a tolylene diisocyanate modified oxidized wax. The properties of these waxes are as follows:

The waxes of the present invention are effective in paints at very low concentrations which are lower than those required for prior art additives, as the instant waxes can suitably be used in amounts as low as 1 pound per 100 gallons of total composition; the effective upper limit is about 20 pounds per 100 gallons of total composition.

Detailed test data on the rheological-property modifying agents of this invention and other rheological agents in various paint formulations are given below in Table I.

EVALUATION PROCEDURE

An architectural alkyd gloss enamel having the formulation listed below in Table I was prepared with the various waxes indicated in the Cowles Dissolver, a high speed disc impeller. The temperature developed during dispersion was between about 140° and 150° C. Such a temperature development is normal when processing paint in the equipment employed. The waxes were incorporated into the paint in the grinding portion of the paint by melting the wax into an organic liquid vehicle, in this case mineral spirits, and then letting it cool to form a gel.

In order to determine whether the waxes of Examples 2 through 7 suppress seeding during dispersion at high temperatures or subsequently under relatively high temperature storage conditions, about ½-pint samples of the paint of each example were heated in an oven for 2 hours at 200° F. The samples were then allowed to cool gradually and were checked for anti-seeding development by means of a Hegman fineness of grind gage. The gage readings run from 0–8 with 0 indicating a particle of 4 mils or larger, while 8 represents maximum fineness. This determination was used as a means of demonstrating the heat stability characteristics of paint samples having added thereto different types of waxes including the waxes of the present invention.

The anti-sag properties of the paint samples evaluated were determined in the following manner:

The paint sample was mixed with a spatula to insure homogeneity. Thereafter, it is aged for 30 minutes to permit adequate recovery of any viscosity or yield value which may have been temporarily lowered due to the agitation. A representative sample of this composition (3–4 cc.) is puddled at the top of Morest Chart (Form

| Type | Melting Point, °F. | Penetration (ASTM D1321-57T) at 77° F. | Color ASTM D 1500 Max. | Acid No. | Saponification No. |
|---|---|---|---|---|---|
| Petrolite C-7500 | 205–215 | 1–3 | White | 10–15 | 25–35 |
| Petrolite C-8500 | 200–210 | 5–7 | Cream | 5–10 | 15–25 |
| Petrolite C-9500 | 190–200 | [1] 7 | White | 25–35 | 45–60 |
| Cerathane 63-L | [2] 200 | 1–3 | Lt. yellow | 25–35 | 50–65 |

[1] Maximum.
[2] Minimum.

The waxes of this invention are preferably powdered into a finely divided solid form and can be introduced during preparation of the powdered form. For convenience of incorporation in paint, the powdered wax should, preferably, have a fineness of at least 100 mesh. These waxes are incorporated in the paint as part of the pigment or other solid grind. This preferred procedure is generally also the easiest, most efficient and least expensive for realizing the maximum benefits from these thixotropic agents. The grinding or dispersion action is desirable primarily in order to achieve maximum dispersion of the wax particles.

The beneficial effects imparted by the thixotropic wax agents of this invention are a function of the temperature to which the agent is subject during the production of the fine particle suspension. For greatest efficiency, a high processing temperature is desirable. Generally, the temperature during the grinding should fall between about 120° and about 180° F. While higher processing temperatures are satisfactory, little increase in efficiency results from their use. A lower processing temperature than 120° F. results in slightly lower efficiency and thus a higher level should be used.

07, Blank White). A two-inch wide applicator is used to draw down a film (3-mil wet film thickness) the length of the chart. Immediately after the draw-down is completed, two lines are drawn rapidly and completely across the film (with the Morest Chart resting on a flat surface) so as to give two paint-free bands for observation. A metal device known as a sag-liner is desirably used to draw bands having widths of approximately 1/32 inch and 5/32 inch, respectively. Immediately after these bands are drawn, the chart is hung in a vertical position, preferably in a constant temperature (room temperature) and humidity (50% relative humidity) room, for 24 hours or until dry. The films are then rated according to the following system:

No sag—those films which reveal no evidence whatsoever of paint movement during the 24-hour aging period for either sag line.

Very slight sag—those films where the paint runs part way across either sag line but fails to contact the other side.

Slight sag—those films where the paint runs completely across the narrower sag line at some point, but not completely across the broader sag line.

Sag—those films where some portion of the paint runs down and across both sag lines to touch and become continuous with the other side.

The pigment settling ratings for the paint formulations in Table I was based on the conventional spatula test well known in the art for visual rating of pigment settling.

Alternatively, the following test is useful for quantitatively evaluating the degree of pigment or other fine particle settling in paints or in other compositions during shelf storage. The pigment settling tester consists essentially of a tripod base supporting a central, vertical, tubular sleeve (carrying a graduated linear scale) through which runs a loose-fitting plunger (¼ inch diameter). The bottom end of the plunger is fitted with a thin flat disc (1.5 inches in diameter) which is perforated concentrically with four holes (¼ inch diameter). The upper end of the plunger is fitted with a pan on which weights can be placed to exert a driving action on the plunger and perforated disc. By the use of this gage, it is possible to systematically probe the layering of pigment which may have settled to the bottom of a can of paint during a given time period. Because of the non-uniform nature of pigment settling, this test is performed in a stepwise fashion through an increase in loading at half-minute intervals. This loading process is continued until the disc touches and comes to rest on the bottom of the can or until the maximum loading of 1000 grams is reached with a layer of pigment still present which resists displacement. The test is run on a one-quart sample of the composition under test in a one-quart commercial paint container (4 inches in diameter and 4.5 inches in height). The paint gage scale is adjusted, with the tripod legs of the gage straddling an empty paint can and resting on the same plane surface on which the can is placed, so that the zero reading of the scale coincides with the position at which the perforated disc is touching the bottom of the can. In running the test, the tripod, with plunger assembly held high up in the tripod sleeve, is placed over the paint can (as described in connection with the scale adjustment). The plunger assembly is then gently lowered manually so that the perforated disc is immersed just below the surface of the paint. At this point, the plunger is released and a stop watch is started to time subsequent loading intervals. The pan at the top of the plunger is loaded according to the following schedule:

| Time (minutes) | Weight Added (grams) | Total Weight (grams) (including plunger assembly) |
|---|---|---|
| 0 | 0 | 100 |
| .5 | 100 | 200 |
| 1.0 | 200 | 400 |
| 1.5 | 200 | 600 |
| 2.0 | 200 | 800 |
| 2.5 | 200 | 1,000 |
| 3.0 | End of test | |

Readings from the graduated scale of the tubular sleeve (opposite the index line on the plunger rod) are taken immediately before each loading of the plunger pan and at the end of the test. A graphic plot of loading versus height of plunger disc above can bottom gives a good visual indication of the nature and degree of pigment settling. By the use of this gage, a layer of settled pigment 0.01 inch in thickness becomes measurable. The usual procedure is to run this test on paints or similar compositions which have been shelf aged at room temperature for 2 weeks to 1 month from the time of preparation of the composition.

TABLE I.—ARCHITECTURAL ALKYD GLOSS ENAMEL

| Paint Formulations | Pounds per 100 Gallons — Example | | | | | | |
|---|---|---|---|---|---|---|---|
| | 1 | 2 | 3 | 4 | 5 | 6 | 7 |
| Rutile Titanium Dioxide [1] | 220 | 220 | 220 | 220 | 220 | 220 | 220. |
| Rutile Titanium Calcium [2] | 220 | 220 | 220 | 220 | 220 | 220 | 220. |
| Alkyd Vehicle 70% Nonvolatile [3] | 474 | 474 | 474 | 474 | 474 | 474 | 474. |
| Mineral Spirits | 145 | 145 | 145 | 145 | 145 | 145 | 145. |
| 24% Lead Naphthenate | 3 | 3 | 3 | 3 | 3 | 3 | 3. |
| 6% Cobalt Naphthenate | 2 | 2 | 2 | 2 | 2 | 2 | 2. |
| Anti-Skin Agent (ASA) | 1 | 1 | 1 | 1 | 1 | 1 | 1. |
| Wax: | | | | | | | |
| Petrolite C-7500 | 0 | 4 | 0 | 0 | 0 | 0 | 0. |
| Petrolite C-8500 | 0 | 0 | 4 | 0 | 0 | 0 | 0. |
| Petrolite C-9500 | 0 | 0 | 0 | 4 | 0 | 0 | 0. |
| Microcrystalline wax (unoxidized) [4] | 0 | 0 | 0 | 0 | 4 | 0 | 0. |
| Natural wax [5] | 0 | 0 | 0 | 0 | 0 | 4 | 0. |
| Hydrogenated Castor Oil [6] | 0 | 0 | 0 | 0 | 0 | 0 | 4. |
| Testing: | | | | | | | |
| Fineness of Grind | 7 | 7 | 7 | 7 | 7 | 7 | 0. |
| Viscosity (KU) | 70 | 95 | 85 | 80 | 72 | 71 | ([7]). |
| Sag Control | Poor sag | No sag | Very slight sag | Slight sag | Poor sag | Poor sag | ([7]). |
| Pigment Settling (1 month aging) | Some | None | None | None | Some | Some | ([7]). |
| Accelerated Heat Aging Test (2 hrs. at 200° F.): | | | | | | | |
| Fineness of Grind | 7, no seeds | 7, no seeds | 7, no seeds | 7, no seeds | 3-4, slight seeds | 0, seeds | 0, seeds. |

[1] Titanox RA (available commercially from Titanium Pigments Corp.).
[2] Titanox RCHT-X (available commercially from Titanium Pigment Corp.).
[3] Aroplaz 1266-M-70 (available commercially from Archer-Daniels Midland Co.).
[4] Petrolite C-700 (available commercially from Petrolite Corp.).
[5] Carnauba Wax (available commercially from Cornelius Wax Refining Corp.).
[6] Castor Wax (available commercially from Baker Castor Oil Co.).
[7] Paint not tested because heavy seeding during processing made it difficult to obtain any correct measurements.

As demonstrated in Table I hydrogenated castor oil is quite unsatisfactory as a suspending and thixotropic agent at elevated temperatures. Since much of the commercial paint processing equipment normally produces such temperatures in the paint being processed, it is essential that the suspending and thixotropic agent be capable of producing a heat stable suspension. The paint samples containing unoxidized microcrystalline wax (Example 5) and a natural wax (Example 6), revealed low viscosity and poor sag control and were rated similar to Example 1, having no wax additive as far as thixotropy is concerned. Examples 2, 3 and 4, based on waxes of this invention exhibited viscosity increase, sag control, no settling and no seeding when heated for 2 hours at 200° F. The wax additive of Example 2 was rated the best on thixotropic action.

It is to be understood that changes and variations may be made without departing from the spirit and scope of the invention as defined in the appended claims.

What is claimed is:

1. The method of improving the rheological properties of a non-aqueous solvent based paint product suitable for use as a non-transferable protective coating which comprises adding to said paint product in an amount from about 1 to about 20 lbs. per 100 gallons of paint product a modified oxidized hydrocarbon wax selected from the class consisting of modified oxidized microcrystalline waxes and modified oxidized Fischer-Tropsch waxes, said modified oxidized wax being obtained by oxidizing under conventional oxidation conditions for non-benzenoid hydrocarbon waxes a member selected from the class consisting of microcrystalline waxes and Fischer-Tropsch waxes with a member selected from the class consisting of low molecular weight polyethylenes, high molecular weight polyethylenes, emulsifiable polyethylenes, mixtures of polyethylenes and emulsifiable polyethylenes, and blends of high and low molecular weight polyethylenes.

2. The method of improving the rheological properties of a non-aqueous solvent based paint product suitable for use as a non-transferable protective coating which comprises adding to said paint product in an amount from about 1 to about 20 lbs. per 100 gallons of paint product a modified oxidized hydrocarbon wax selected from the class consisting of modified oxidized microcrystalline waxes and modified oxidized Fischer-Tropsch waxes, said modified oxidized waxes being obtained by reacting a member selected from the class consisting of oxidized microcrystalline waxes and oxidized Fischer-Tropsch waxes, prepared under conventional oxidiation conditions for non-benzenoid hydrocarbon waxes, with a member selected from the class consisting of low molecular weight polyethylenes, high molecular weight polyethylenes, emulsifiable polyethylenes, mixtures of polyethylenes and emulsifiable polyethylenes and blends of high and lower molecular weight polyethylenes.

3. The method of claim 1, wherein the modified oxidized hydrocarbon wax is a modified oxidized Fischer-Tropsch wax obtained by oxidizing a Fischer-Tropsch wax with a lower molecular weight polyethylene.

4. The method of claim 1, wherein said modified oxidized hydrocarbon wax is further modified by reaction with from about 1 to about 6 percent by weight, based on the total weight of the composition, of an arylene diisocyanate.

5. The method of claim 4 wherein the arylene diisocyanate is tolyene diisocyanate.

6. The method of improving the rheological properties of a non-aqueous solvent based paint product suitable for use as a non-transferable protective coating which comprises adding to said paint product in an amount from about 1 to about 20 lbs. per 100 gallons of total paint product a modified oxidized hydrocarbon wax selected from the class consisting of modified oxidized microcrystalline waxes and modified oxidized Fischer-Tropsch waxes, said modified oxidized wax being obtained by reacting a member selected from the class consisting of oxidized microcrystalline waxes and oxidized Fischer-Tropsch waxes, prepared under conventional oxidiation conditions for non-benzenoid hydrocarbon waxes with about 1 to about 6 percent by weight of an arylene diisocyanate, based on the combined weight of said wax and said arylene diisocyanate.

7. The method of improving the rheological properties of a non-aqueous solvent based paint product suitable for use as a non-transferable protective coating which comprises adding to the paint product in an amount from about 1 to about 20 lbs. per 100 gallons of paint product a modified oxidized hydrocarbon wax selected from the class consisting of modified oxidized microcrystalline waxes and modified oxidized Fischer-Tropsch waxes, said wax having a melting point between about 180° F. and about 230° F., a penetration between about 0 and about 7, an acid number between about 5 and about 35 and a saponification number between about 15 and about 65.

8. The method of improving the rheological properties of a non-aqueous solvent based paint product suitable for use as a non-transferable protective coating which comprises adding to the paint product in an amount from about 1 to about 20 lbs. per 100 gallons of paint product a modified oxidized Fischer-Tropsch wax having a melting point between about 205° F. and about 215° F., a penetration between about 1 and about 3, an acid number between about 10 and about 15 and a saponification number between about 25 and about 35.

9. The method of improving the rheological properties of a non-aqueous solvent based paint product suitable for use as a non-transferable protective coating which comprises adding to the paint product in an amount from about 1 to about 20 lbs. per 100 gallons of paint product a modified oxidized Fischer-Tropsch wax having a melting point between about 200 and about 210° F., a penetration between about 5 and about 7, an acid number between about 5 and about 10 and a saponification number between about 15 and about 25.

10. The method of improving the rheological properties of a non-aqueous solvent based paint product suitable for use as a non-transferable protective coating which comprises adding to the paint product in an amount from about 1 to about 20 lbs. per 100 gallons of paint product a modified Fischer-Tropsch wax having a melting point between about 190 and about 200° F., a maximum penetration of about 7, an acid number between about 25 and about 35 and a saponification number between about 45 and about 60.

11. The method of improving the rheological properties of a non-aqueous solvent based paint product suitable for use as a non-transferable protective coating which comprises adding to the paint product in an amount from about one to about 20 lbs. per 100 gallons of paint product a modified oxidized wax having a minimum melting point of about 200° F., a penetration between about 1 and about 3, an acid number between about 25 and about 35 and a saponifiction number between about 50 and about 65.

References Cited

UNITED STATES PATENTS

| | | | |
|---|---|---|---|
| 2,879,238 | 3/1959 | De Groote | 260—28 |
| 2,890,125 | 6/1959 | Mange | 106—23 |
| 3,201,381 | 8/1965 | Hagemeyer | 260—451 |
| 2,798,841 | 9/1957 | Fish | 260—451 |
| 3,260,609 | 7/1966 | Reeser | 260—28 |
| 3,123,488 | 3/1964 | Linlaw | 260—28 |

JULIUS FROME, *Primary Examiner.*